US012617068B2

(12) United States Patent
Pritzen

(10) Patent No.: US 12,617,068 B2
(45) Date of Patent: May 5, 2026

(54) METHOD FOR OPERATING A HAND-GUIDED WORKING APPARATUS, AND HAND-GUIDED WORKING APPARATUS

(71) Applicant: Andreas Stihl AG & Co. KG, Waiblingen (DE)

(72) Inventor: Thomas Pritzen, Bittenfeld (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 970 days.

(21) Appl. No.: 17/380,561

(22) Filed: Jul. 20, 2021

(65) Prior Publication Data

US 2022/0024015 A1 Jan. 27, 2022

(30) Foreign Application Priority Data

Jul. 21, 2020 (EP) ..................................... 20187023

(51) Int. Cl.
*B25F 5/00* (2006.01)
*A01D 34/00* (2006.01)
(Continued)

(52) U.S. Cl.
CPC ............ *B25F 5/006* (2013.01); *A01D 34/006* (2013.01); *A01D 69/02* (2013.01); *A01D 34/416* (2013.01);
(Continued)

(58) Field of Classification Search
CPC .......... B25F 5/006; B25F 5/024; B25F 5/026; A01D 34/006; A01D 34/416; A01D 34/475; A01D 34/6806; A01D 34/905
(Continued)

(56) References Cited

U.S. PATENT DOCUMENTS 4,825,548 A * 5/1989 Driggers ................. B25F 5/026
D8/8
2002/0004988 A1 1/2002 Stoll et al.
(Continued)

FOREIGN PATENT DOCUMENTS

CN 101107912 A 1/2008
DE 100 34 437 A1 1/2002
(Continued)

OTHER PUBLICATIONS

Extended European Search Report issued in European Application No. 20187023.5 dated Jan. 15, 2021 with partial English translation (nine (9) pages).
(Continued)

*Primary Examiner* — Linda J. Hodge
(74) *Attorney, Agent, or Firm* — Crowell & Moring LLP

(57) ABSTRACT

A method operates a hand-guided working apparatus having a movable working tool installation, a shaft, and a drive motor system. The shaft is designed for moving the working tool installation. The drive motor system is designed for driving the shaft. The working tool installation, the shaft, and the drive motor system at least in part form part of a system capable of rotational oscillation. A controllable oscillation damping installation is designed for damping and/or reducing an excitation of at least one oscillation of the system capable of rotational oscillation and/or excitable by the system capable of rotational oscillation. The method includes: operating the drive motor system to drive the shaft for moving the working tool installation; and controlling the oscillation damping installation during operation such that the oscillation is at least damped and/or an excitation of the oscillation is reduced.

12 Claims, 6 Drawing Sheets

(51) Int. Cl.

| | |
|---|---|
| *A01D 69/02* | (2006.01) |
| *A01D 34/416* | (2006.01) |
| *A01D 34/47* | (2006.01) |
| *A01D 34/68* | (2006.01) |
| *A01D 34/84* | (2006.01) |
| *A01D 101/00* | (2006.01) |

(52) U.S. Cl.
CPC ........ *A01D 34/475* (2013.01); *A01D 34/6806* (2013.01); *A01D 34/84* (2013.01); *A01D 2101/00* (2013.01)

(58) Field of Classification Search
USPC ............................................ 173/162.1, 162.2
See application file for complete search history.

(56) References Cited

U.S. PATENT DOCUMENTS

| | | | |
|---|---|---|---|
| 2006/0289183 A1 | 12/2006 | Schreiber | |
| 2007/0056414 A1 | 3/2007 | Saeterbo et al. | |
| 2008/0016705 A1 | 1/2008 | Machens et al. | |
| 2009/0038283 A1* | 2/2009 | Hurley ................... | A01D 34/84 56/12.7 |
| 2010/0294097 A1 | 11/2010 | Aoki et al. | |
| 2015/0184324 A1 | 7/2015 | Mo | |
| 2023/0023782 A1* | 1/2023 | Yun ..................... | G05B 19/4147 |

FOREIGN PATENT DOCUMENTS

| | | | | | |
|---|---|---|---|---|---|
| DE | 10332522 A1 | * | 2/2005 | ........... | B25D 17/043 |
| DE | 10 2005 031 074 A1 | | 1/2007 | | |
| EP | 745782 A2 | * | 12/1996 | .............. | F16F 15/02 |
| EP | 2380420 A1 | * | 10/2011 | ............. | A01B 1/065 |
| JP | H08253950 | * | 10/1996 | ........... | E02F 9/2207 |
| JP | 2002-295576 A | | 10/2002 | | |
| JP | 2016-152689 A | | 8/2016 | | |
| KR | 1020180091111 | * | 8/2018 | ............. | B25F 5/006 |
| RU | 117 059 U1 | | 6/2012 | | |
| WO | WO-2006095227 A1 | * | 9/2006 | ............. | E21B 7/025 |
| WO | WO 2008/097138 A1 | | 8/2008 | | |

OTHER PUBLICATIONS

English translation of Chinese-language Office Action issued in Chinese Application No. 202110823120.1 dated Mar. 10, 2025 (10 pages).

* cited by examiner

METHOD FOR OPERATING A HAND-GUIDED WORKING APPARATUS, AND HAND-GUIDED WORKING APPARATUS

CROSS REFERENCE TO RELATED APPLICATION

This application claims priority under 35 U.S.C. § 119 from European Patent Application No. 20187023.5, filed Jul. 21, 2020, the entire disclosure of which is herein expressly incorporated by reference.

BACKGROUND AND SUMMARY OF THE INVENTION

The invention relates to a method for operating a hand-guided working apparatus and to a hand-guided working apparatus.

The invention is based on providing a method for operating a hand-guided working apparatus, and a hand-guided working apparatus, said method and said working apparatus each having improved properties, in particular so as to enable a high level of comfort for a user of the working apparatus.

The invention achieves this object by providing a method and a hand-guided working apparatus having the features of the independent claims. Advantageous refinements and/or design embodiments of the invention are described in the dependent claims.

The, in particular automatic, method according to the invention is designed or configured or provided for, in particular automatically, operating a hand-guided working apparatus. The working apparatus comprises or has a movable, working tool installation which is in particular movable for turning or rotation, a shaft which is in particular movable for turning or rotation, a drive motor system, and a, in particular electrically, controllable, in particular electric, in particular electronic, aoscillation damping installation. The shaft is designed or configured for moving, in particular moving by turning or rotation, in particular at least one part of the working tool installation. The drive motor system is designed or configured for driving, in particular moving by turning or rotation, the shaft. The working tool installation, the shaft and the drive motor system form, in particular each, at least in part at least one part of a system at least capable of rotational or torsional oscillation. The oscillation damping installation is designed or configured at least for, in particular indirectly and/or directly, damping and/or, in particular indeed, for, in particular indirectly and/or directly, reducing, in particular avoiding, an excitation, in particular a non-excitation, of at least a oscillation, in particular a rotational or torsional oscillation, in particular an amplitude of the oscillation, of the system capable of rotational oscillation, and/or excitable, or capable of being excited, in particular indirectly and/or indirectly, by the system capable of rotational oscillation. The method comprises or has the steps: a) operating, in particular automatically operating, the drive motor system for driving the shaft for moving the working tool installation, in particular by the user; b) controlling, in particular automatically controlling, the oscillation damping installation during operation or during step a) or simultaneously with operating or with step a), respectively, in such a manner that the oscillation is at least damped and/or, in particular indeed, an excitation of the oscillation is reduced, in particular avoided, in particular not excited.

This, in particular the damping and/or the reduction, in particular the avoidance, of an excitation of the oscillation enables low or indeed no stress on the user, in particular on a wrist of the user. This thus enables a high level of comfort for the user.

The hand-guided working apparatus can in particular be a hand-held working apparatus. Additionally or alternatively, hand-guided, in particular hand-held, working apparatus may mean that the working apparatus has a mass of at most 50 kilograms (kg), in particular of at most 20 kg, in particular of at most 10 kg, in particular of at most 5 kg, and/or of at least 1 kg, in particular of at least 2 kg. Furthermore additionally or alternatively, the working apparatus can be a garden working apparatus, a forestry working apparatus, and/or a construction working apparatus.

The working tool installation can be a garden working tool installation, a forestry working tool installation, and/or a construction working tool installation. Additionally or alternatively, the working tool installation can be movable in a linear or translatory manner, respectively.

The shaft and the working tool installation can be mechanically connected to one another for movement. Additionally or alternatively, the shaft can be a rigid shaft or a flexible shaft.

The drive motor system and the shaft can be mechanically connected to one another for movement.

The working tool installation can be disposed in the region of an, in particular lower and/or first, end, in particular at the end, of the shaft, and/or the drive motor system can be disposed in the region of an, in particular other and/or upper and/or second, in particular opposite, end, in particular at the end, of the shaft.

The working tool installation, in particular at least in part as at least one part of a first mass, the shaft, in particular at least in part as at least one part of a torsion spring, in particular a torsion bar spring, and the drive motor system, in particular at least in part as at least one part of a second mass, can form at least one part of a dual-mass oscillator, or of a dual-mass oscillation system, respectively, and/or the system at least capable of rotational oscillation can be a dual-mass oscillation system and/or the oscillation can be the oscillation of a dual-mass oscillator, or of a dual-mass oscillation system, respectively.

The system at least capable of rotational oscillation, in particular the shaft, can additionally be capable of flexural oscillation. Additionally or alternatively, the oscillation can be a flexural oscillation. Furthermore additionally or alternatively, the oscillation can be a natural oscillation and/or resonance oscillation.

The oscillation can be, in particular indirectly and/or directly, excitable and/or be excited by the operation of the drive motor system, at least without controlling the oscillation damping installation, and/or by an external interference of the movement of the working tool installation, such as a shock on the working tool installation, for example, such as by a hard ground or a rock, for example.

In a refinement of the invention, the working apparatus is a cutting apparatus, in particular a brushcutter or a motor scythe, respectively, or an edge trimmer. Additionally or alternatively, the working tool installation is a cutting tool installation; the working tool installation comprises or has in particular a cutting line, a cutting knife, or a cutting blade, in particular having at least one cutting edge and/or having at least one cutting tooth. In such a working apparatus, and/or such a working tool installation, the oscillation can be excitable and/or excited in a particularly intense manner by operating the drive motor system, at least without controlling the oscillation damping installation, and/or by an external interference of the movement of the working tool installation. The damping and/or the reduction, in particular the avoidance, of an excitation of the oscillation is thus particularly advantageous for such a working apparatus and/or such an working tool installation.

In a refinement of the invention, the working apparatus comprises or has an, in particular movable, gearbox. The gearbox is designed or configured for moving, in particular moving by turning or rotation, in particular at least the part, of the working tool installation, and the shaft is designed or configured for moving, in particular moving by turning or rotation, in particular at least one part, of the gearbox. Additionally or alternatively, the gearbox is designed or configured for driving, in particular for moving by turning or rotation, the shaft, and the drive motor system is designed or configured for driving, in particular moving by turning or rotation, in particular at least one part, of the gearbox. The gearbox at least in part forms one part of the system capable of rotational oscillation. In particular, the gearbox and the working tool installation, and the shaft and the gearbox, and/or the gearbox and the shaft, and the drive motor system and the gearbox, can, in particular in each case, be mechanically connected to one another for movement. Additionally or alternatively, the gearbox can be disposed in the region of the working tool installation and/or of the one and/or lower and/or first end, in particular at the end, of the shaft, and/or in the region of the drive motor system and/or of the other and/or upper and/or second end, in particular at the end, of the shaft. Furthermore additionally or alternatively, the gearbox, in particular at least in part as one part of the first mass or of the second mass, can form a part of the dual-mass oscillator or of the dual-mass oscillation system, respectively.

In a refinement of the invention, the working apparatus comprises or has a shank or a tube, respectively. The shaft is, in particular at least in part, disposed, in particular mounted, in the shank. The working tool installation, in particular at least in part, and the drive motor system, in particular at least in part, are mechanically connected to one another, in particular in a fixed manner, by means of at least the shank. The system capable of rotational oscillation is in particular mechanically closed by means of at least the shank. The shank makes it possible that the oscillation may be perceivable on the outside, or to the user, respectively, at least without controlling the oscillation damping installation. The shank can in particular at least in part form a part of the system capable of rotational oscillation. Additionally or alternatively, the shank can be capable of flexural oscillation. Furthermore additionally or alternatively, the oscillation, in particular the flexural oscillation, can at least in part be the oscillation of the shank. In particular, the, in particular external, flexural oscillation of the shank can be excitable by the, in particular internal, rotational oscillation of the system capable of rotational oscillation, in particular if the shaft is a flexible shaft. Furthermore additionally or alternatively, the working tool installation can be disposed in the region of an, in particular lower and/or first, end, in particular at the end, of the shank, and/or the drive motor system can be disposed in the region of an, in particular other and/or upper and/or second, in particular opposite, end, in particular at the end, of the shank. Furthermore additionally or alternatively, the shank, in particular at least in part as at least one part of a, in particular the, torsion spring, in particular of a, in particular the, torsion bar spring, can form a part of a, in particular the, dual-mass oscillator, or of a, in particular the, dual-mass oscillation system, respectively.

In a refinement, in particular a design embodiment, of the invention, the working apparatus comprises or has at least one handle. The at least one handle is disposed in the region of the shaft, so as to be between ends, in particular in a centre, of the shaft, in particular fastened to the shank, to the extent the latter is present. The at least one handle enables the working apparatus to be guided, in particular carried, by the user, on the one hand, and that the oscillation can be perceivable to the user, or be perceived on the outside, respectively, at least without controlling the oscillation damping installation.

In a refinement of the invention, the oscillation damping installation comprises or has at least one, in particular an electric, actuator, in particular at least one solenoid or a cylindrical coil, respectively, and/or a linear actuator. The at least one actuator is at least designed or configured for, in particular indirectly and/or directly, damping and/or, in particular indeed, for, in particular indirectly and/or directly, reducing, in particular avoiding, an excitation, in particular a non-excitation, of at least the oscillation. Step b) comprises or has: controlling, in particular automatically controlling, the at least one actuator in such a manner that the oscillation is at least damped and/or, in particular indeed, an excitation of the oscillation is reduced, in particular avoided, in particular not excited. This enables the active damping and/or the active reduction, in particular the active avoidance, of an excitation of the oscillation. In particular, the actuator can be designed for generating, in particular to generate, a mechanical movement for damping and/or for reducing, in particular avoiding, an excitation of the oscillation, in particular for compensating the oscillation. Additionally or alternatively, the actuator can have, in particular be, a piezo actuator, in particular a piezo film. Furthermore additionally or alternatively, the actuator can be disposed, in particular fastened, in the region of the working tool installation and/or of the one and/or lower and/or first end, in particular at the end, of the shaft or of the shank, and/or in the region of the drive motor system and/or of the other and/or upper and/or second end, in particular at the end, of the shaft or of the shank, and/or in the region of the shaft, in particular on the shank, to the extent the latter is present, so as to be between the ends, in particular in the centre, of the shaft.

In a refinement of the invention, the drive motor system and the oscillation damping installation, in particular having the at least one actuator, are completely different, or separate from one another, respectively. This makes it possible that the oscillation damping installation can be retrofitted in the, in particular existing, working apparatus.

In a refinement, in particular a design embodiment, of the invention, the drive motor system comprises or has an internal combustion drive engine. The internal combustion drive engine is designed or configured for driving, in particular for moving by turning or rotation, the shaft. Step a) comprises or has: operating, in particular automatically operating, the internal combustion drive engine for driving the shaft for moving the working tool installation, in particular by the user. The oscillation damping installation can in particular have the at least one actuator, and/or the oscillation damping installation and the drive motor system having the internal combustion drive engine can be completely different.

In a refinement of the invention, the drive motor system and the oscillation damping installation are at least in part, in particular completely, integrated or combined or identical, respectively. This enables a synergy effect and thus a savings effect, and/or the passive damping and/or the passive reduction, in particular the passive avoidance, of an excitation of the oscillation.

In a refinement, in particular a design embodiment, of the invention, the, in particular electric, in particular in electronic, drive motor system comprises or has an electric drive motor. The electric drive motor is designed or configured for driving, in particular moving by turning or rotation, the shaft. In particular, the drive motor system having the, in particular controllable, electric drive motor and the oscillation damping installation are at least in part integrated. Step a) comprises or has: operating, in particular automatically operating, the electric drive motor for driving the shaft for moving the working tool installation, in particular by the user. Step a) and/or step b), comprise/comprises or have/has in particular: controlling, in particular automatically controlling, and/or operating, in particular automatically operating, the electric drive motor in such a manner that the oscillation is at least damped and/or, in particular indeed, an excitation of the oscillation is reduced, in particular avoided, in particular not excited. The working apparatus can in particular be an electric working apparatus, in particular a working apparatus with a rechargeable battery.

In a design embodiment of the invention, the oscillation damping installation comprises or has an, in particular electric, in particular electronic, notch filter. Step a) and/or step b) comprise/comprises or have/has: operating and/or controlling the electric drive motor while, or by means of, using the notch filter, in particular by means of filtering, in particular automatically filtering, in particular only, a frequency component or a frequency proportion, to the extent present or contained, in particular of a natural frequency and/or resonance frequency of the oscillation that excites at least the oscillation, from an, in particular physical, variable signal, in particular a nominal torque signal, a nominal current signal and/or a feedback variable signal, in particular for operating and/or controlling the electric drive motor, an electronic motor control unit, in particular an electronic closed-loop control unit, of the drive motor system. In other words: filtering, in particular automatically filtering, the variable signal by means of the notch filter in such a manner that in the frequency spectrum of the variable signal the frequency component or the frequency proportion, in particular of the natural frequency and/or resonance frequency, that excites at least the oscillation, to the extent present or contained, is suppressed. This enables the reduction, in particular the avoidance, of an excitation of the oscillation.

Additionally or alternatively, steps a) and b) comprise or have: filtering, in particular automatically filtering, in particular only, a, in particular the, frequency component or a, in particular the, frequency proportion that excites at least the oscillation, to the extent present or contained, in particular a, in particular the, natural frequency and/or resonance frequency of the oscillation, from a, in particular the, variable signal, in particular a, in particular the, nominal torque signal, a, in particular the, nominal current signal and/or a, in particular the, feedback variable signal, in particular for operating and/or controlling the electric drive motor, a, in particular the, electronic motor control unit, in particular a, in particular the, electronic closed-loop motor control unit, of the drive motor system, in particular by means of the notch filter. In other words: filtering, in particular automatically filtering, the variable signal, in particular by way of a filter characteristic, in such a manner that in the frequency spectrum of the variable signal the frequency component or the frequency proportion, in particular of the natural frequency and/or the resonance frequency that excites at least the oscillation, to the extent present or contained, is suppressed.

The oscillation, in particular a value and/or a frequency and/or an amplitude of the oscillation, can in particular be fixedly predefined or set, in particular ex works. Step b) can comprise or have: controlling, in particular automatically controlling, based on, or as a function of, the fixedly predefined oscillation.

In a refinement of the invention, the method comprises or has the step: detecting, in particular automatically and/or indirectly and/or directly detecting, at least one actual oscillation, in particular a value and/or frequency and/or an amplitude of the actual oscillation, of the system capable of rotational oscillation and/or excited by the system capable of rotational oscillation, in particular during step a), or simultaneously with step a), and/or temporally before step b) and/or during step b), or simultaneously with step b), respectively. Step b) comprises or has: controlling, in particular automatically controlling, based on, or as a function of, at least the detected nominal oscillation. This enables a flexibility and/or an adaptation, in particular in terms of aging and/or a tolerance of at least one part of the working apparatus and/or the active damping and/or the active reduction, in particular the active avoidance, of an excitation of the oscillation. The actual oscillation can in particular be like the previously described oscillation. Additionally or alternatively, the detecting can be carried out or performed by means of at least one sensor, in particular of the working apparatus.

In a design embodiment of the invention, the method comprises or has: detecting at least the nominal oscillation by means of the oscillation damping installation and/or the drive motor system, in particular by means of detecting, in particular and analyzing, a temporal actual operating data profile, in particular a temporal profile of values of the operating data, in particular a temporal nominal rotating speed and/or current and/or voltage and/or power profile, in particular a temporal profile of a value of the actual rotating speed and/or of the actual current and/or of the actual voltage and/or of the actual power, of the drive motor system, in particular having the electric drive motor. This enables a synergy effect and thus a savings effect. In terms of detecting at least the actual oscillation by means of detecting the temporal actual operating data profile, reference is made in particular to the technical literature and/or the content hereunder.

In a refinement of the invention, the shaft has a length of at least 0.5 metre (m), in particular of at least 1 m, and/or of at most 4.5 m, in particular of at most 3 m, in particular of 1.5 m. Additionally or alternatively, the oscillation has a frequency, in particular a, in particular the, natural frequency and/or resonance frequency of at least 2 Hertz (Hz), in particular of at least 5 Hz, in particular of at least 10 Hz, and/or of at most 100 Hz, in particular of at most 50 Hz. This length enables this frequency. Additionally or alternatively, this frequency enables the oscillation to be able to be particularly perceivable by the user.

The hand-guided working apparatus according to the invention comprises or has a, in particular the, movable working tool installation, a, in particular the, shaft, a, in particular the, drive motor system, a, in particular the, controllable oscillation damping installation, and an, in particular electric, operating and controlling installation. The shaft is designed for moving the working tool installation. The drive motor system is designed for driving the shaft. The working tool installation, the shaft and the drive motor system at least in part form at least a, in particular the at least one, part of a, in particular the, system at least capable of rotational oscillation. The oscillation damping installation is designed at least for damping and/or for reducing, in particular avoiding, an excitation of at least one, in particular the at least one, oscillation of the system capable of rotational oscillation and/or excitable by the system capable of rotational oscillation. The operating and controlling installation is designed or configured for, in particular automatically, operating the drive motor system for driving the shaft for moving the working tool installation, and for, in particular automatically, controlling the oscillation damping installation during operation in such a manner that the oscillation is at least damped, and/or an excitation of the oscillation is reduced, in particular avoided.

The working apparatus can enable the same advantage/advantages as previously described in the context of the method.

The working apparatus, in particular the operating and controlling installation, can in particular be designed or configured for, in particular automatically, carrying out a method as described above. Additionally or alternatively, the working apparatus can be designed or configured as has been previously described in the context of the method. Further additionally or alternatively, the operating and controlling installation can have a microcontroller, in particular can be a microcontroller.

Further advantages and aspects of the invention are derived from the claims and from the description hereunder of preferred exemplary embodiments of the invention which are explained hereunder by means of the figures.

DETAILED DESCRIPTION OF THE DRAWINGS

Figure 4:
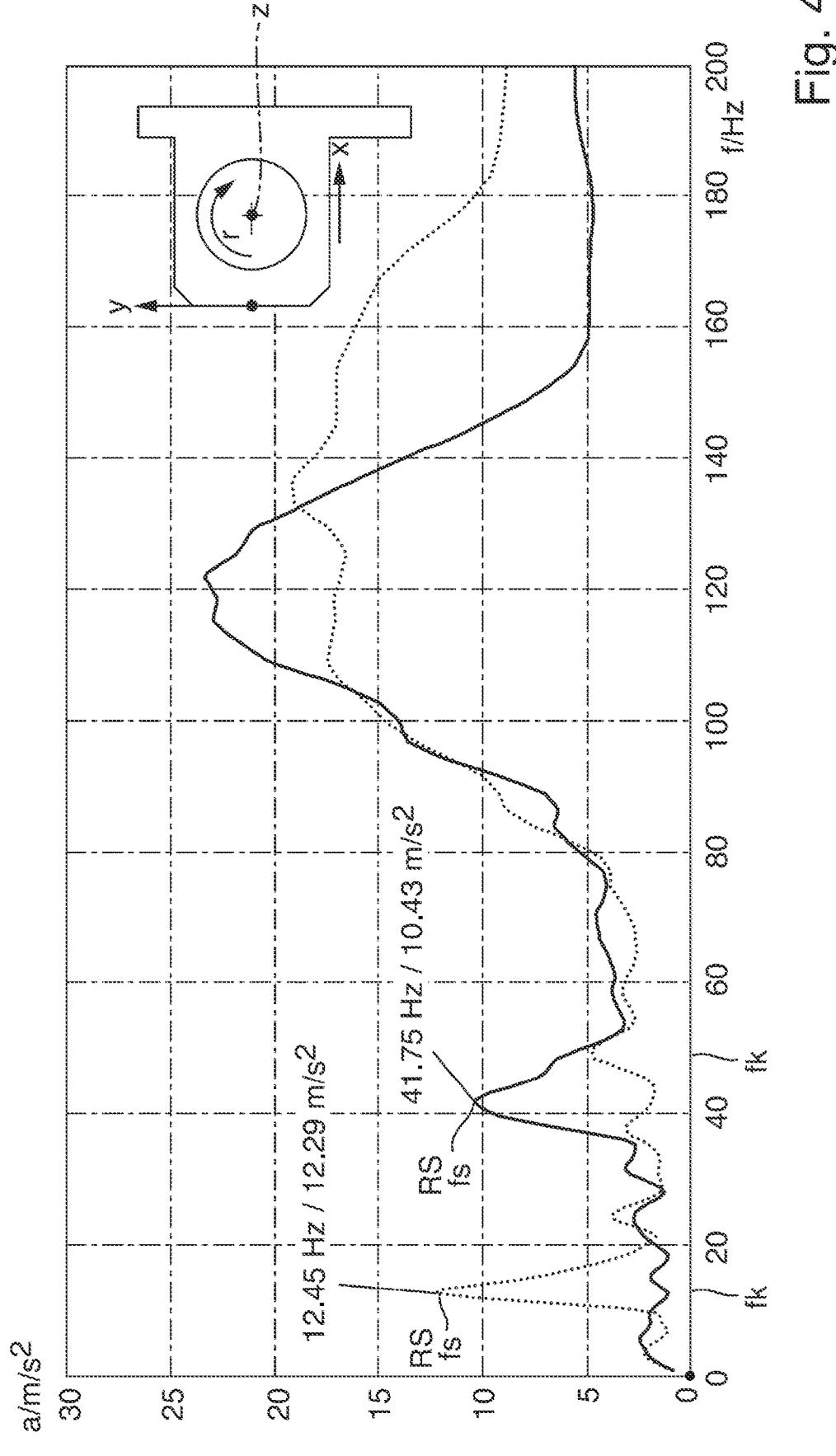
FIG. 4 schematically shows a graph of a respective rotational oscillation, in particular of an amplitude of an acceleration over a frequency, of the respective working apparatus of FIGS. 1 and 2, having a rigid shaft or a flexible shaft, without controlling an oscillation damping installation of the respective working apparatus of the method.
Figure 5:
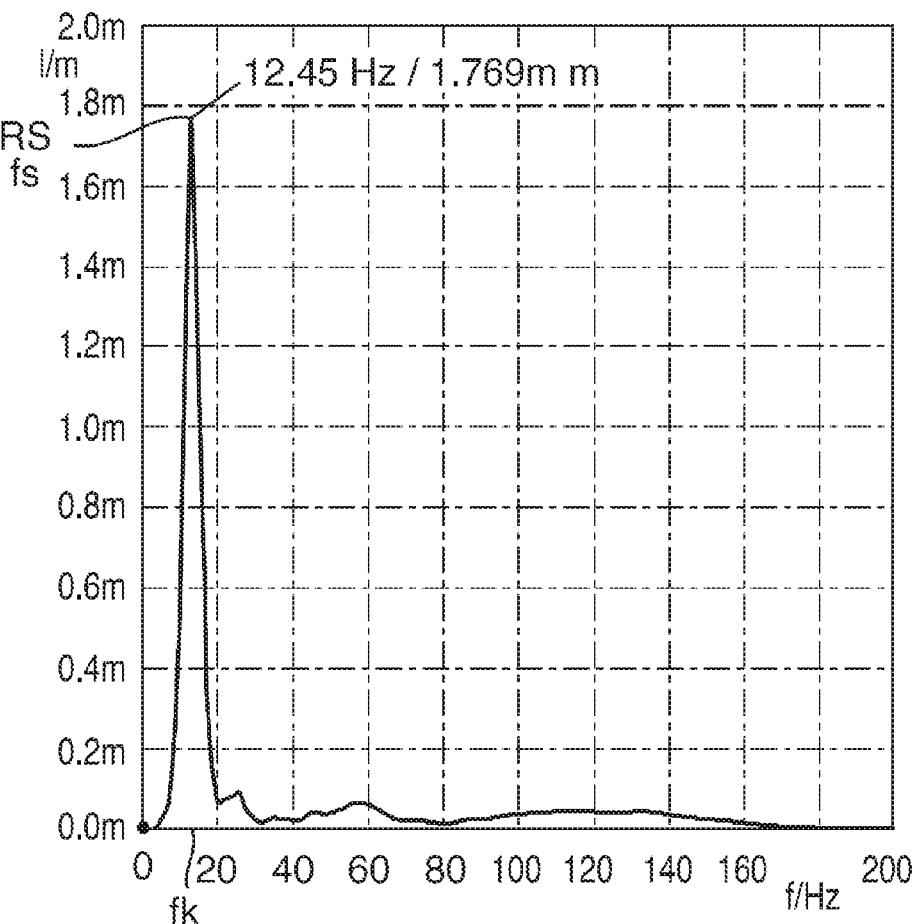
FIG. 5 schematically shows a graph of a respective flexural oscillation, in particular of an amplitude of a deflection over a frequency, of the respective working apparatus of FIGS. 1 and 2, having the flexible shaft, without controlling a oscillation damping installation of the respective working apparatus of the method.

FIGS. 1, 2, 3 and 7, in particular each, show a hand-guided working apparatus 1. The working apparatus 1 has a movable working tool installation 2, a shaft 3, a drive motor system 4, a controllable oscillation damping installation 6, and an operating and controlling installation 15. The shaft 3 is designed, in particular moved, for moving the working tool installation 2. The drive motor system 4 is designed for driving the shaft 3 and in particular drives the latter. The working tool installation 2, the shaft 3, and the drive motor system 4 form at least in part at least one part of a system 5 at least capable of rotational vibrating. The oscillation damping installation 6 is designed at least for damping and/or for reducing, in particular avoiding, an excitation of at least one oscillation RS of the system 5 capable of rotational oscillation, and/or excitable by the system 5 capable of rotational oscillation, as is shown in FIGS. 4 and 5, in particular damping and/or reducing, in particular avoiding said oscillation RS. The operating and controlling installation 15 is designed for operating the drive motor system 4 for driving the shaft 3 for moving the working tool installation 2, and for controlling the oscillation damping installation 6 during the operation in such a manner that the oscillation RS is at least damped and/or an excitation of the oscillation RS is reduced, in particular avoided; said operating and controlling installation 15 in particular operating and controlling the drive motor system 4.

FIGS. 1, 2, 3, 6 and 7 show a method for operating the hand-guided working apparatus 1. The working apparatus 1 has the movable working tool installation 2, the shaft 3, the drive motor system 4, and the controllable oscillation damping installation 6. The shaft 3 is designed for moving the working tool installation 2. The drive motor system 4 is designed for driving the shaft 3. The working tool installation 2, the shaft 3, and the drive motor system 4 form at least in part the at least one part of the system 5 at least capable of rotational oscillation. The oscillation damping installation 6 is designed at least for damping and/or for reducing, in particular avoiding, an excitation of the at least one oscillation RS of the system 5 capable of rotational oscillation, and/or excitable by the system 5 capable of rotational oscillation. The method comprises the steps: a) operating the drive motor system 4 for driving the shaft 3 for moving the working tool installation 2, in particular by means of the operating and controlling installation 15; b) controlling the oscillation damping installation 6 during operation in such a manner that the oscillation RS is at least damped and/or an excitation of the oscillation RS is reduced, in particular avoided, in particular by means of the operating and controlling installation 15.

Figure 1:
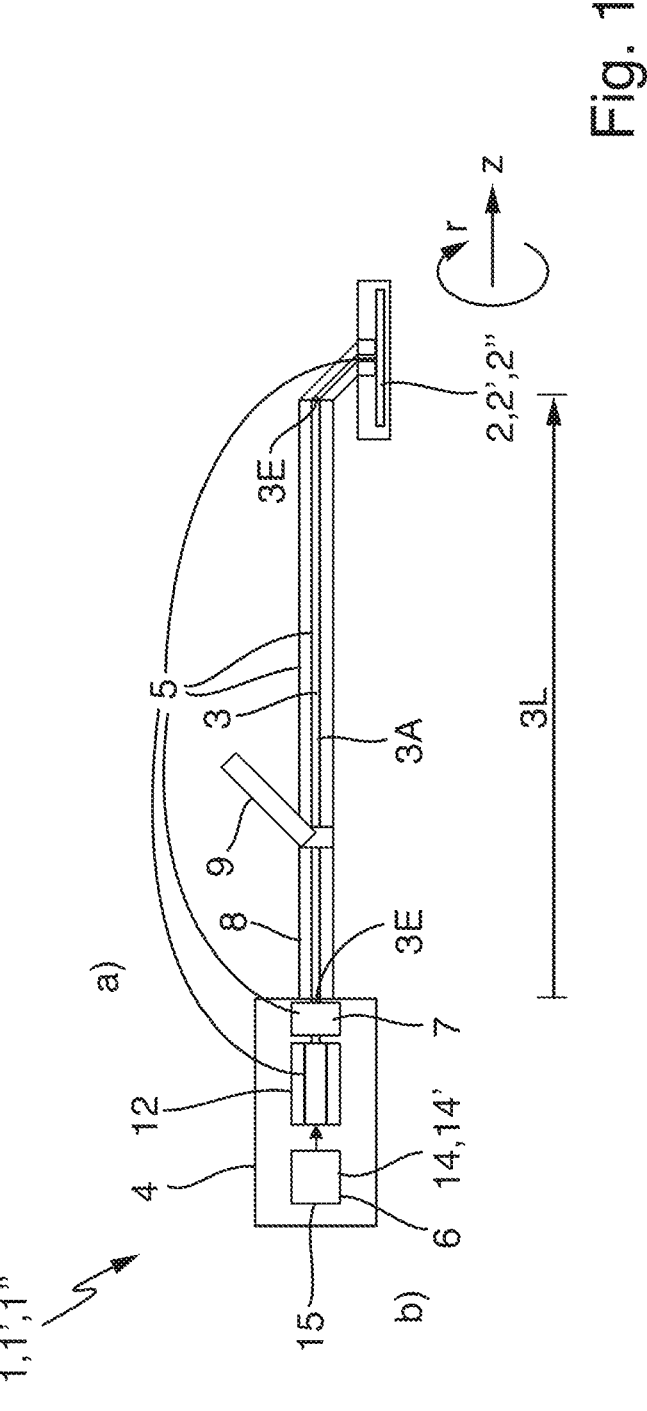
FIG. 1 schematically shows a hand-guided working apparatus according to an embodiment of the invention in the form of a brushcutter, having a cutting line, and a method according to an embodiment of the invention for operating the hand-guided working apparatus.
Figure 2:
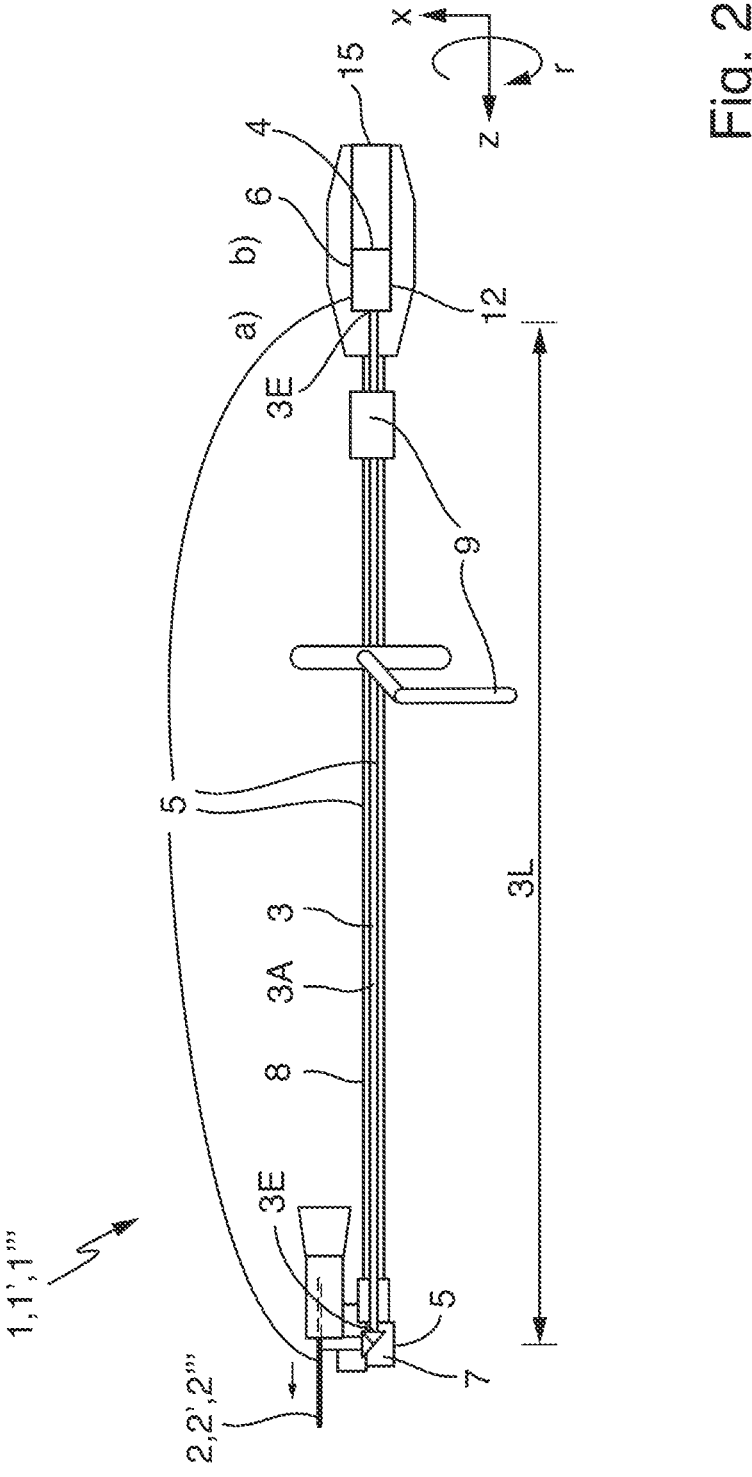
FIG. 2 schematically shows a further hand-guided working apparatus in the form of an edge trimmer, having a cutting knife, and the method for operating the hand-guided working apparatus.

In the exemplary embodiments shown, the working apparatus 1 is a cutting apparatus 1', in particular a brushcutter 1", as is shown in FIG. 1, or an edge trimmer 1''', as is shown in FIG. 2.

In alternative exemplary embodiments, the cutting apparatus can be a pole-mounted pruner or a hedge trimmer.

Additionally or alternatively, the working tool installation 2 in the exemplary embodiments shown is a cutting tool installation 2'; the working tool installation 2 has in particular a cutting line 2", as is shown in FIG. 1, or a cutting knife 2''', as is shown in FIG. 2.

The working apparatus 1 furthermore has a gearbox 7. The gearbox is designed, in particular moved, for moving the working tool installation 2, and the shaft 3 is designed, in particular moved, for moving the gearbox 7, as is shown in FIG. 2. Alternatively, the gearbox 7 is designed for driving the shaft 3, in particular driving the latter, and the drive motor system 4 is designed for driving the gearbox 7, in particular driving the latter, as is shown in FIG. 1. The gearbox 7 at least in part forms a part of the system 5 capable of rotational oscillation.

The working apparatus 1 moreover has a shank 8. The shaft 3 is disposed in the shank 8. The working tool installation 2 and the drive motor system 4 are mechanically connected to one another by means of at least the shank 8. In particular, the system 5 capable of rotational oscillation is mechanically closed by means of at least the shank 8.

The working apparatus 1 furthermore has at least one handle 9. The at least one handle 9 is disposed in the region of the shaft 3, so as to be between ends 3E of the shaft 3, in particular fastened to the shank 8.

The shaft 3 moreover has a length 3 L of at least 0.5 m, in particular of at least 1 m, and/or of at most 4.5 m, in particular of at most 3 m, in particular of 1.5 m, in particular in a direction z.

Additionally or alternatively, the oscillation RS has a frequency fS, in particular a natural frequency and/or resonance frequency, of at least 2 Hz, in particular of at least 5 Hz, in particular of at least 10 Hz, and/or of at most 100 Hz, in particular of at most 50 Hz, as is shown in FIGS. 4 and 5.

Specifically, the oscillation RS is a rotational oscillation of the system 5 capable of rotational oscillation, in particular about a longitudinal axis 3A of the shaft 3, or about the direction z, as is shown in FIG. 4.

If the shaft 3 is a rigid shaft, the oscillation RS in the form of the rotational oscillation has the frequency fS of, for example, 41.75 Hz, as is shown in FIG. 4, in particular a graph of an amplitude of an acceleration, in particular of the gearbox 7 of the exemplary embodiment of FIG. 2, initiated by the oscillation RS in the form of the rotational oscillation, in a direction y orthogonal to the longitudinal axis 3A of the shaft 3, or the direction z, over a frequency. If the shaft 3 is a flexible shaft, the oscillation RS in the form of the rotational oscillation has the frequency fS of, for example, 12.45 Hz.

The frequency fS of the oscillation RS in the form of the rotational oscillation is determined by an, in particular respective, inertia of the working tool installation 2 (J2) and of the drive motor system 4 (J4), a transmission ratio of the gearbox 7 (ü7) and a rigidity of the shaft 3 (C3), in particular as follows:

$$fS * 2\pi = \sqrt{\frac{C3 * ((J4 + ü7^2) + J2)}{J4 * J2}}$$

In the exemplary embodiments shown, the system 5 at least capable of rotational oscillation, in particular the shaft 3 and the shank 8, are additionally capable of flexural oscillation.

In particular, the shank 8 at least in part forms a part of the system 5 capable of rotational oscillation and capable of flexural oscillation.

Specifically, the oscillation RS is a flexural oscillation of the system 5 at least capable of rotational oscillation, in particular of the shaft 3 and of the shank 8, and excitable, in particular by means of a structure of the working apparatus 1, by the rotational oscillation of the system 5 capable of rotational oscillation, in particular in a direction x orthogonal to the longitudinal axis 3A of the shaft 3, or the direction z and/or the direction y, as is shown in FIG. 4, in particular if the shaft 3 is the flexible shaft.

In particular if the shaft 3 is the flexible shaft, the oscillation RS in the form of the flexural oscillation has the frequency fS of, for example, 12.45 Hz, as is shown in FIG. 5, in particular a graph of an amplitude of a deflection initiated by the oscillation RS in the form of the flexural oscillation, in particular of the handle 9, in the direction x orthogonal to the longitudinal axis 3A of the shaft 3, or the direction z and/or the direction y, over a frequency.

The control of the oscillation damping installation 6 during operation enables the oscillation RS to be at least damped and/or an excitation of the oscillation RS to be reduced, in particular avoided.

Figure 7:
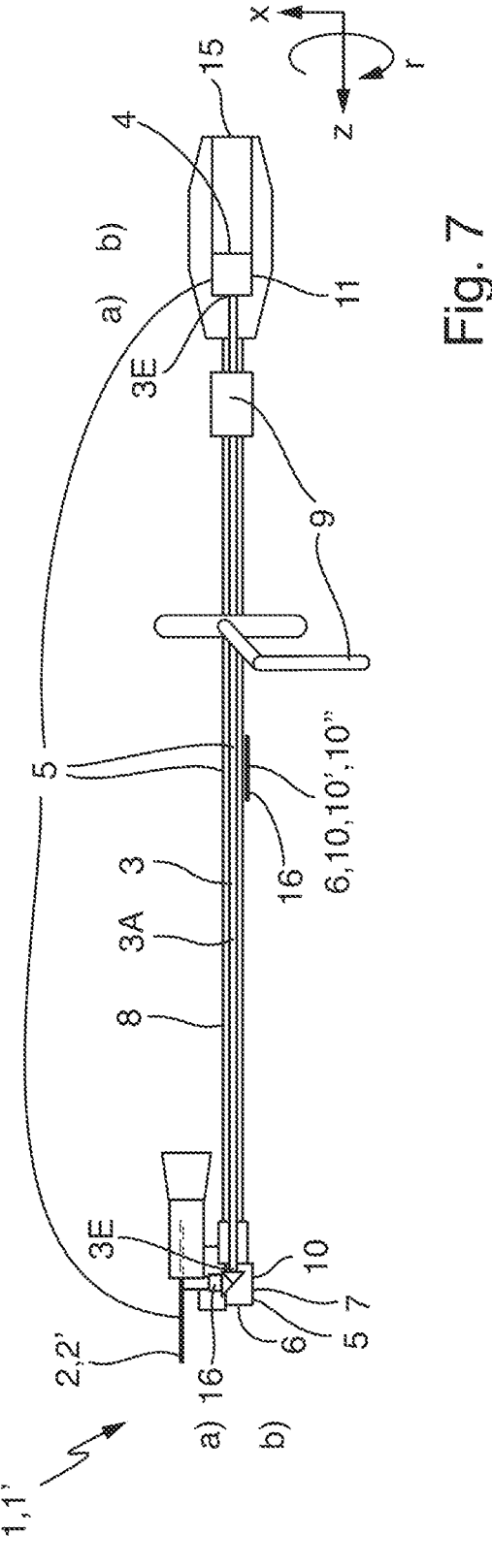
FIG. 7 schematically shows yet a further hand-guided working apparatus and the method for operating the hand-guided working apparatus.

Specifically, the oscillation damping installation 6 in the exemplary embodiment of FIG. 7 has at least one actuator 10, in particular at least one solenoid 10' and/or a linear actuator 10". The at least one actuator 10 is at least designed for damping and/or for reducing, in particular avoiding, an excitation at least of the oscillation RS, in particular damping and/or reducing, in particular avoiding, the latter. Step b) comprises: controlling the at least one actuator 10 in such a manner that the oscillation RS is at least damped and/or an excitation of the oscillation RS is reduced, in particular avoided, in particular by means of the operating and controlling installation 15.

Moreover, the drive motor system 4 and the oscillation damping installation 6 in the exemplary embodiment of FIG. 7 are completely different from one another.

The drive motor system 4 in the exemplary embodiment of FIG. 7 furthermore has an internal combustion drive engine 11. The internal combustion drive engine 11 is designed for driving, in particular drives, the shaft 3. Step a) comprises: operating the internal combustion drive engine 11 for driving the shaft 3 for moving the working tool installation 2, in particular by means of the operating and controlling installation 15.

Figure 3:
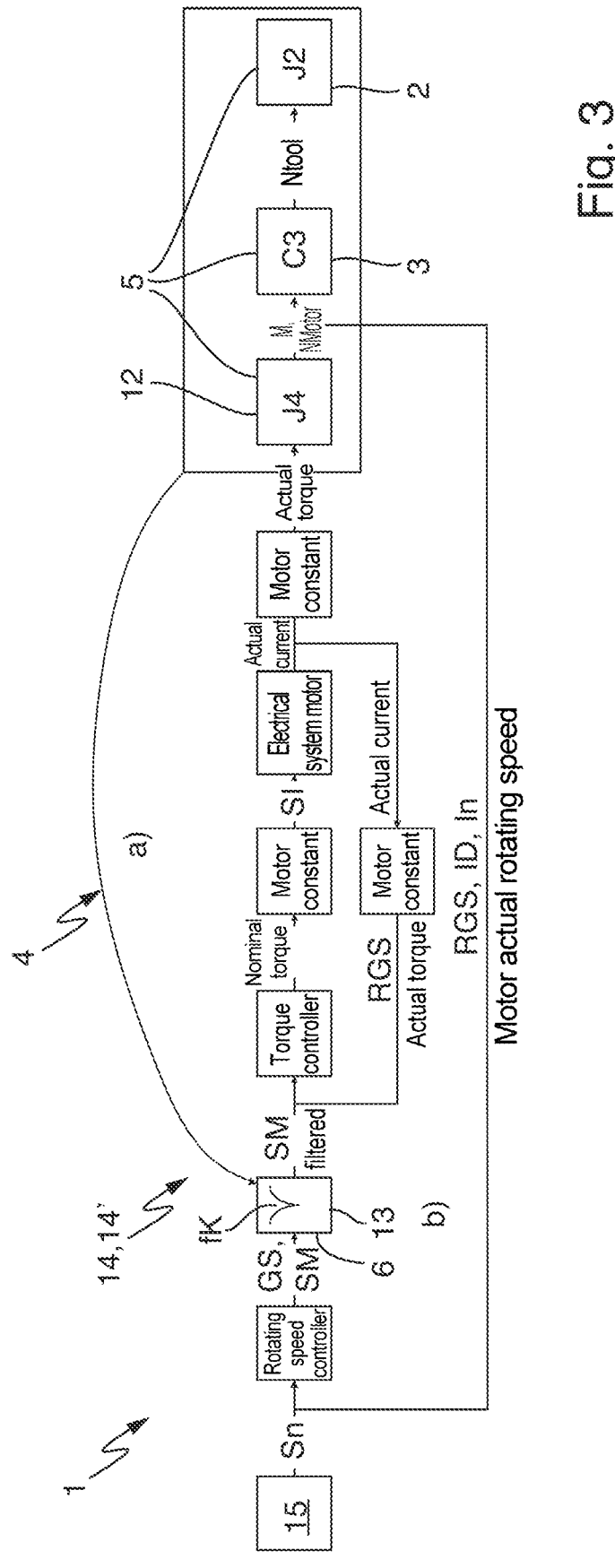
FIG. 3 schematically shows details of the respective working apparatus of FIGS. 1 and 2.

Moreover, the drive motor system 4 and the oscillation damping installation 6 in the exemplary embodiments of FIGS. 1, 2, and 3 are at least partially integrated.

The drive motor system 4 in the exemplary embodiments of FIGS. 1, 2, and 3 furthermore has an electric drive motor 12. The electric drive motor 12 is designed for driving, in particular drives, the shaft 3. In particular, the drive motor system 4 having the electric drive motor 12, and the oscillation damping installation 6 are at least partially integrated. Step a) comprises: operating the electric drive motor 12 for driving the shaft 3 for moving the working tool installation 2, in particular by means of the operating and controlling installation 15. Step a) and/or step b) comprise/comprises in particular: controlling and/or operating the electric drive motor 12 in such a manner that the oscillation RS is at least damped and/or an excitation of the oscillation RS is reduced, in particular avoided, in particular by means of the operating and controlling installation 15.

Specifically, the oscillation damping installation 6 has a notch filter 13, as is shown in FIG. 3. Step a) and/or step b) comprise/comprises: operating and/or controlling the electric drive motor 12 while using the notch filter 13, in particular by means of filtering a frequency component fK, in particular of the natural frequency and/or the resonance frequency fS of the oscillation RS, that excites at least the oscillation RS, as in shown in FIG. 4, from a variable signal GS of an electronic motor control unit 14, in particular an electronic closed-loop motor control unit 14', in FIG. 3 in the form of a cascade control, of the drive motor system 4.

In the exemplary embodiments shown, filtering takes place from the variable signal GS in the form of a nominal torque signal SM, in particular while using the notch filter 13 at an output of a rotating speed controller of the electronic closed-loop motor control unit 14'. In alternative exemplary embodiments, filtering can take place from the variable signal GS in the form of a nominal current signal SI or a feedback variable signal RGS.

The electronic motor control unit 14 is in particular designed for controlling, the electronic closed-loop motor control unit 14' in particular for controlling in a closed loop, a torque M generated by the drive motor system 4, in particular the electric drive motor 12, for achieving an in particular temporally constant nominal rotating speed Sn, in particular for controlling, in particular controlling in a closed loop, the latter.

The nominal rotating speed Sn can be achieved in a state of the working apparatus 1, in particular of the drive motor system 4, in particular of the electric drive motor 12, without load.

Since the frequency fS of the oscillation RS may lie in a dynamic range of the rotating speed controller, this meaning that the oscillation RS can be excited by the electronic rotating speed controller, the notch filter 13 enables the damping and/or the reduction, in particular the avoidance, of an excitation of the oscillation RS.

The method can be referred to as electric, in particular electronic, and/or controlled, in particular closed-loop controlled, oscillation damping.

Figure 6:
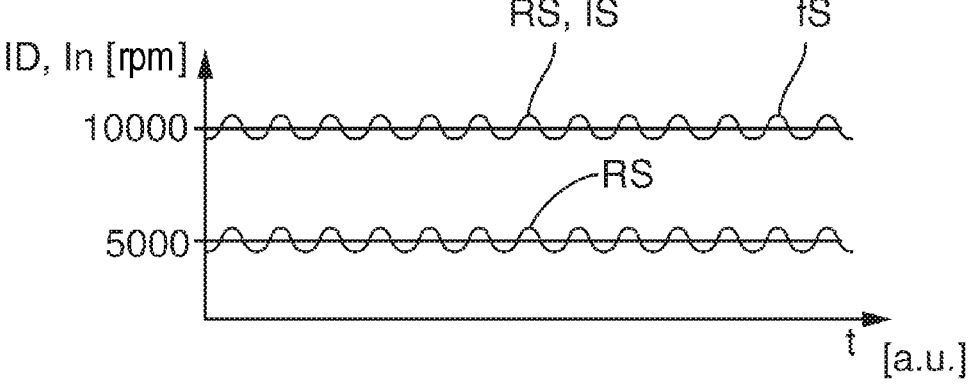
FIG. 6 schematically shows detecting an actual oscillation of the respective working apparatus of FIGS. 1 and 2 of the method, in particular a graph of a temporal actual rotating speed profile of a drive motor system of the working apparatus over time.

The method moreover comprises the step: detecting at least one actual oscillation IS of the system 5 capable of rotational oscillation and/or excited by the system 5 capable of rotational oscillation, in particular during step a) and/or temporally before step b), and/or during step b), as is shown in FIG. 6. Step b) comprises: controlling based on at least the detected actual oscillation IS.

The detection in the exemplary embodiment of FIG. 7 is carried out by means of at least one sensor 16 of the working apparatus 1.

The sensor 16 is in particular disposed, in particular fastened, in the region of the working tool installation 2 and/or an, in particular lower and/or first, end, in particular at the end, of the shaft 3 or of the shank 4, and/or in the region of the shaft 3, so as to be between the ends 3E, in particular in the centre, of the shaft 3, in particular on the shank 8.

Additionally or alternatively, the sensor 16 can be a rotating speed sensor, in particular for detecting an actual rotating speed, in particular on the tool, in the region of the working tool installation 2, in particular of the working tool installation 2.

Furthermore additionally or alternatively, the detection in the other exemplary embodiments, in particular of FIGS. 1, 2, and 3, can also be carried out by means of the at least one sensor 16 of the working apparatus 1.

The actual rotating speed on the tool and an actual rotating speed on the motor, in particular of the drive motor system 4, in particular of the electric drive motor 12, in particular, and a position signal can thus be available. The oscillation RS can thus at least be actively damped, and/or an excitation of the oscillation RS be actively reduced, in particular actively avoided, by the drive motor system 4 having the electric drive motor 12, in particular, and the electronic closed-loop motor control unit 14', and the oscillation damping installation 6 at least partially integrated, in particular by means of the operating and controlling installation 15.

The method shown in the exemplary embodiments of FIGS. 1, 2, and 3 comprises: detecting at least the actual oscillation IS by means of the oscillation damping installation 6 and/or the drive motor system 4, in particular by means of detecting a temporal actual operating data profile ID of the drive motor system 4, in particular without the sensor 16.

In the exemplary embodiments shown, the temporal actual operating date profile ID is detected in the form of a temporal actual rotating speed profile In. In alternative exemplary embodiments, the temporal actual operating data profile can be detected in the form of a temporal actual current and/or voltage and/or power profile.

As is shown in FIG. 6, the temporal operating data profile ID, in particular in the form of the temporal actual rotating speed profile In, in the case of what should be temporally constant actual operating data, in particular because the nominal operating data should be temporally constant, in particular in the case of what should be a temporally constant actual rotating speed, in particular because the nominal rotating speed Sn should be temporally constant, at, for example, 5000 revolutions per minute (rpm) or 10,000 rpm, has the actual oscillation IS, in particular having the frequency IS, which is in particular independent of the rotating speed, in particular, and an amplitude of several 100 rpm.

In alternative exemplary embodiments, the temporal operating data profile, in particular the rotating speed, in particular of the working tool installation, can also be estimated without a sensor by a so-called "monitor".

As is highlighted by the exemplary embodiments shown and explained above, the invention provides an advantageous method for operating a hand-guided working apparatus, and an advantageous hand-guided working apparatus, each having improved properties, enabling in particular a high level of comfort for a user of the working apparatus.

What is claimed is:

1. A method for operating a hand-guided working apparatus, wherein the working apparatus comprises:

a movable working tool installation;

a shaft, wherein the shaft is configured for moving the working tool installation;

at least one handle disposed in a region of the shaft so as to be between ends of the shaft;

a drive motor system having an electric drive motor configured for driving the shaft;

wherein the working tool installation, the shaft and the drive motor system at least in part form at least one part of a system capable of rotational oscillation; and a controllable oscillation damping installation, wherein the oscillation damping installation at least dampens and/or reduces an excitation of at least one oscillation of the system capable of rotational oscillation and/or excitable by the system capable of rotational oscillation;

wherein the oscillation damping installation has a notch filter, wherein the drive motor system having the electric drive motor and the oscillation damping installation are completely electronically integrated; and wherein the method comprises the steps of:

a) operating the electric drive motor to drive the shaft for moving the working tool installation; and b) controlling the oscillation damping installation during operation in such a manner that the oscillation is at least damped and/or an excitation of the oscillation is reduced;

and further wherein step a) and/or step b) comprises:

operating and/or controlling the electric drive motor in a manner to at least dampen the oscillation and/or to reduce an excitation of the oscillation by operating and/or controlling the electric drive motor while using the notch filter by filtering a frequency component, that excites at least the oscillation, from a variable signal in the form of a nominal torque signal, a nominal current signal and/or a feedback variable signal, of an electronic motor control unit of the drive motor system; and wherein the method further comprises:

detecting at least the actual oscillation by way of the drive motor system, by detecting a temporal actual operating data profile, of the drive motor system.

2. The method according to claim 1, wherein the working apparatus is a cutting apparatus; and/or the working tool installation is a cutting tool installation.

3. The method according to claim 2, wherein the cutting apparatus is a brushcutter or an edge trimmer; and/or wherein the cutting tool installation comprises a cutting line, a cutting knife or a cutting blade.

4. The method according to claim 1, wherein the working apparatus has a gearbox, wherein the gearbox is configured for moving the working tool installation and wherein the shaft is configured for moving the gearbox, or wherein the gearbox is configured for driving the shaft and wherein the drive motor system is configured for driving the gearbox; and wherein the gearbox at least in part forms a part of the system capable of rotational oscillation.

5. The method according to claim 1, wherein the working apparatus has a shank;

wherein the shaft is disposed in the shank; and wherein the working tool installation and the drive motor system are mechanically connected to one another by way of at least the shank, including the system capable of rotational oscillation being mechanically closed by way of at least the shank.

6. The method according to claim 5, wherein the at least one handle is fastened to the shank.

7. The method according to claim 1, wherein the method further comprises the step of:

detecting at least one actual oscillation of the system capable of rotational oscillation and/or excited by the system capable of rotational oscillation during step a) and/or temporally before step b) and/or during step b); and wherein step b) comprises:

controlling based at least on the detected actual oscillation.

8. The method according to claim 7, wherein the method further comprises:

detecting at least the actual oscillation by way of the oscillation damping installation, by detecting a temporal actual operating data profile, of the drive motor system.

9. The method according to claim 8, wherein the detected temporal actual operating data profile is a temporal actual rotating speed and/or current and/or voltage and/or power profile, of the drive motor system.

10. The method according to claim 1, wherein the shaft has a length of at least 0.5 m, and/or of at most 4.5 m; and/or wherein the oscillation has a frequency of at least 2 Hz, and/or of at most 100 Hz.

11. The method according to claim 1, wherein the electronic motor control unit of the drive motor system is an electronic closed-loop motor control unit.

12. A hand-guided working apparatus, comprising:

a movable working tool installation;

a shaft, wherein the shaft is configured for moving the working tool installation;

at least one handle disposed in a region of the shaft so as to be between ends of the shaft;

a drive motor system having an electric drive motor configured for driving the shaft;

wherein the working tool installation, the shaft and the drive motor system at least in part form at least one part of a system capable of rotational oscillation;

a controllable oscillation damping installation, wherein the oscillation damping installation at least dampens and/or reduces an excitation of at least one oscillation of the system capable of rotational oscillation and/or excitable by the system capable of rotational oscillation;

wherein the oscillation damping installation has a notch filter;

wherein the drive motor system having the electric drive motor and the oscillation damping installation are completely electronically integrated; and an operating and controlling installation, wherein the operating and controlling installation is configured to:

operate the electric drive motor system to drive the shaft for moving the working tool installation;

operate and/or control the electric drive motor of the drive motor system in a manner to at least dampen the oscillation and/or to reduce an excitation of the oscillation is reduced, wherein the operating and controlling installation operates and/or controls the electric drive motor while using the notch filter by filtering a frequency component, that excites at least the oscillation, from a variable signal in the form of a nominal torque signal, a nominal current signal and/or a feedback variable signal, of an electronic motor control unit of the drive motor system, and wherein the operating and controlling installation detects at least the actual oscillation by way of the drive motor system, by detecting a temporal actual operating data profile, of the drive motor system.

*     *     *     *     *